Figure 1:
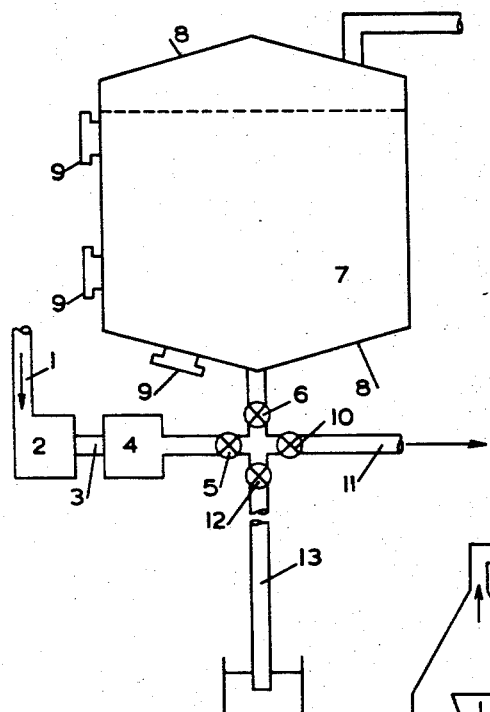

Dec. 24, 1968  A. E. RABE  3,418,165

PROCESS FOR THE CLARIFICATION OF SUGAR JUICES AND THE LIKE

Filed Sept. 7, 1965

INVENTOR
ARNOLD EDWARD RABE

By Shoemaker and Mattare
ATTYS.

United States Patent Office 3,418,165
Patented Dec. 24, 1968

3,418,165
PROCESS FOR THE CLARIFICATION OF SUGAR
JUICES AND THE LIKE
Arnold E. Rabe, % Umzimkula Sugar Company Limited,
Port Shepstone, Natal, Republic of South Africa
Filed Sept. 7, 1965, Ser. No. 485,477
Claims priority, application Republic of South Africa,
Sept. 18, 1964, 4,465/64
10 Claims. (Cl. 127—48)

This invention relates to an improved process for the clarification of raw sugar juices for further processing into sugar.

Raw sugar juice, particularly that extracted from sugar cane, contains impurities which must be removed from the juice in order to obtain a solution from which the sugar may be satisfactorily crystallised.

It has for many years been the common practice to use heating and liming of the raw juice in a defecation process to remove the impurities by way of a heavy precipitate of complex composition. This precipitate is generally separated by decantation of the juice after a considerable settling period and it will be appreciated that the process necessarily requires, on a commercial scale, heating plant and time for settling. Inversion frequently occurs when strict supervision of the settling period cannot be maintained.

Also, it is fundamental that the more impurities which can be removed during clarification the better will be the final product as it is often impossible to remove impurities at later stages in the production of sugar. A further point which is well known to adversely affect the quality of a sugar is a high quantity of starch in the raw juice. This is difficult to remove during the process above set forth as the starch goes into solution on heating of the raw juice.

It is the object of this invention to provide a process for the clarification of raw sugar juice from the mills which will simply and effectively provide adequate clarification of raw sugar juices and which will give a good removal of starch from this juice.

According to this invention there is provided a process for the clarification of sugar juice which comprises the liming of the juice to a controlled pH value, effecting precipitation of impurities, the addition of a suitable coagulant to the mxture the subjection of the mixture to a reduced pressure to effect flotation of the coagulated precipitate and the removal of the coagulated precipitate from the surface of the clarified juice.

Further features of this invention provide for the liming of the juice and vacuum flotation of the precipitate to be carried out at ambient temperature and for this process to be conducted as either a batch or a continuous process.

The invention also provides for the clarified juice to be removed directly for evaporation and crystallisation and for the precipitate to be filtered with the filter cake washed with water at ambient temperature to prevent dissolution of the starch and gums content in the filter cake.

As will become apparent from the description below of preferred embodiments of this invention it will be appreciated that various modifications may be introduced into the process as may be dictated by particular circumstances.

Figure 2:
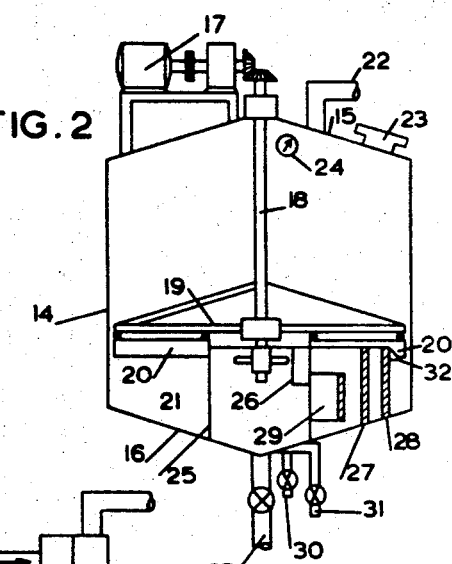
Figure 3:
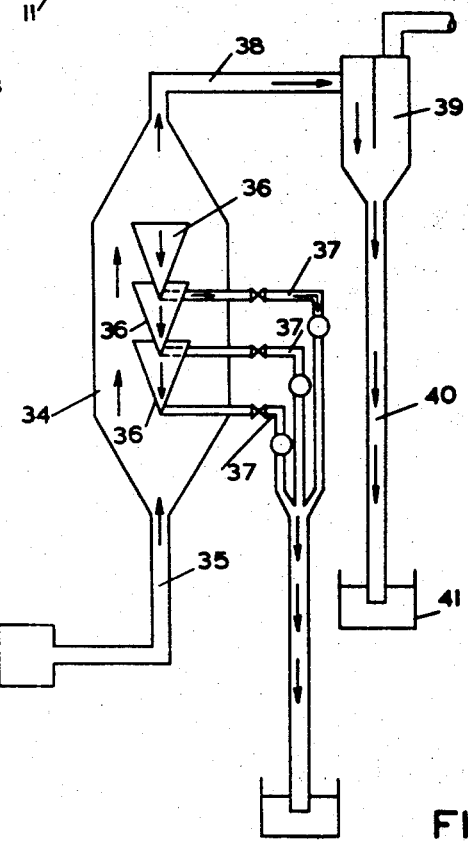

The invention will be described with reference to the accompanying diagrammatic drawings in which:

FIG. 1 illustrates simple apparatus for conducting the process of this invention under a batch operation, and FIGS. 2 and 3 illustrate alternative apparatus for conducting the process on a continuous basis.

Referring firstly to FIG. 1 the process and apparatus will be described for the clarification of raw sugar cane juice obtained from Natal sugar cane in South Africa with its usual high starch content.

Plant and processes which are well known for the production of sugar from cane have not been illustrated as they do not form part of the invention which is confined to the clarification of the juice.

The raw juice extracted by the mills is passed through pipe 1 into a mixer 2 where lime in suitable form is added to bring the pH value to about 9.0 and this limed juice is phosphated back to a pH of 8.5 with the juice under ambient temperatures. The mixture of juice lime and phosphate is then passed through pipe 3 to a station 4 where a commercially available coagulant is introduced into the mixture in the required quantity. The coagulant used is "Separan AP 30", a polyacrylic electrolyte, and is readily available and has been used heretofore in the well known heating and liming clarification. It may be varied without affecting the process according to this invention.

The mixture is then passed through valves 5 and 6 into clarification pan 7 of cylindrical shape having conically shaped top and bottom parts 8. Sight glasses and observation ports 9 are provided so that the interior of pan 7 may be watched at all times. The mixture is introduced to a level above the top sight glass 9.

A sub-atmospheric pressure is then applied to the surface of the mixture in the pan 7 by evacuating the pan by a suitable pump (not shown) and the degree of vacuum has been varied on various occasions between 15" Hg and 27" Hg.

As soon as the pressure above the surface of the mixture has been reduced sufficiently the coagulated precipitate rises rapidly to the surface to form a mud on top of the clarified juice which is in a state for processing immediately in the plant evaporators for crystallisation.

The clarified juice is removed through valves 6 and 10 and along pipe 11.

When the clear juice is completely removed the valve 10 is closed and valve 12 opened to discharge the mud through pipe 13 to the filter plant where further clarified juice is extracted in the usual way but with filter cake wash water under ambient temperature.

Under the previous generally accepted methods of clarification only about 35% of the starch content in the raw juice has been removed.

On particular tests using the process according to this invention as set forth above a starch content in the raw juice of 2438 parts per million was measured and only 308 parts per million in the clarified juice. This gives a starch extraction of 87.4% which is highly satisfactory.

The purpose of using cold wash water on the filter cake during the filtration operation is to prevent any of the starch particles dissolving back into the clear juice and consequently polluting the latter.

From the above it will be appreciated that it is not essential to introduce the lime, phosphate, and coagulant exactly as described and they may in fact all be introduced in the pan 7 which under such circumstances will preferably be fitted with a suitable agitator.

Even where raw juice is obtained from cane wherein the starch content is not objectionably high the above described vacuum flotation of the precipitate may also be utilised, with a consequent saving in time, with the usual heat and lime defecation process.

It may, under some particularly adverse conditions, be advantageous to use the vacuum flotation process twice, firstly with cold raw juice as this is very effective in starch removal, and then with the juice heated as in the usual type of process.

Basically it is envisaged that the process according to this invention will be utilised to provide a saving in both plant and time while giving a better than normal extraction of impurities from the raw juices.

FIG. 2 shows apparatus which may be utilised to render the clarification a continuous process with the usual advantages associated with such operation.

In this form the apparatus consists of a cylindrical drum 14 with conical top 15 and bottom 16. On the top 15 is mounted a motor and gear box assembly 17 driving a downwardly projecting shaft 18 on which is mounted a diametrical bar 19 to which are hinged mud scrapers 20 positioned to travel over an outer annular space 21 in the drum 14.

A vacuum connection 22 and observation port 23 are also provided through the top 15 which will also preferably carry a vacuum gauge 24.

A centre feed well 25 is welded or otherwise secured to the inside surface of the bottom 16 of the drum. A slot 26 through the upper part of the wall of well 25 is provided to allow juice to be introduced into the annular space 21. This space 21 is divided into two compartments by walls 27, 28 and a baffle 29 will preferably extend radially across space 21 adjacent the inlet slot 26. The walls 27 and 28 are positioned near each other and outlet openings 30, 31 from the drum 14 are provided at the base of these walls as shown.

Wall 27 has a shaped weir 32 formed along its upper edge.

In use raw juice treated with lime, phosphate and coagulant is introduced continuously into the drum 14 through inlet 33 into well 25 and thence discharged into annular space 21 through slot 26.

The drum is maintained under reduced pressure by means of a vacuum pump (not shown) coupled to connection 22 and this vacuum causes rapid rising of the precipitated and coagulated mud to the surface of the juice leaving the clarified juice below.

The clear juice is drained continuously through outlet opening 30 by means of a suitable extraction pump (not shown) and all coagulated precipitate will have risen to the surface by the time the juice reaches that outlet.

The mud of coagulated precipitate on the surface is continually swept by mud scrappers 20 over weir 32 to discharge through outlet 31 which is also connected to a suitable extraction pump.

The further treatment of separated mud and clarified juice is the same as described for the batch operation.

FIG. 3 shows a modified construction suitable for continuous operation.

In this form treated raw juice is introduced continuously into tank 34 through the pipe 35. A series of inverted conical extraction cups 36 with outlet pipes 37 are provided through which the clear juice will discharge by gravity for treatment in the plant evaporators.

The mud passes out through the vacuum line 38 at the top of tank 34 which has a trap 39 formed therein so that the mud may be discharged down pipe 40 through sealing well 41 to be filtered as above described.

The time saving rendered possible by the use of the process above described prevents an inversion of surcrose taking place but, when conducted under cold conditions, it should be remembered that the sterilisation effect of the usual heat treatment of the raw juice is lost. It will therefore be essential to maintain the plant under hygienic conditions to prevent the organic degeneration and formation of excessive gums in the otherwise clarified juice.

The above descriptions have been confined to the treatment of raw sugar juice with the flotation process being a vacuum process. It is to be understood that the invention may be used with a pressurised system such that the gaseous content of a sugar juice will, when the latter is subjected to ambient presure, cause flotation of any coagulated precipitate. Also the process according to this invention may be used at various stages during the processing of juice from the cane until the refined liquor is passed for crystallisation. It is particularly suitable for use under circumstances where secondary precipitation of raw juice takes place.

What I claim as new and desire to secure by Letters Patent is:

1. A process for the clarification of sugar juice which comprises the liming of the juice to a controlled pH value, thus effecting precipitation of impurities, the addition of a polyacrylic electrolyte coagulant to the mixture, the subjection of the mixture to a reduced pressure to effect flotation of the coagulated precipitate and the removal of the coagulated precipitate from the surface of the clarified juice.

2. A process as claimed in claim 1 in which the process is carried out at ambient temperature.

3. A process as claimed in claim 1 in which the reduced pressure is a sub-atmospheric pressure.

4. A process for the clarification of sugar juice comprising the continuous addition of lime and polyacrylic electrolyte coagulant to a continuous supply of sugar juice to maintain the latter at a controlled pH value, passing the mixture continuously through a container maintained under reduced pressure to cause continuous surfacing of a precipitate on top of a clarified juice and continuously separating the precipitate from the surface of the clarified juice and removing the clarified juice from the container.

5. A process as claimed in claim 4 in which the precipitate is removed from the surface of the clarified juice by a rotating scraper acting to discharge the precipitate over a weir into an inlet to an extraction pump.

6. A process as claimed in claim 4 in which the precipitate is drawn from the clarified juice by vacuum and the clarified juice descharged through inverted conical extraction cups.

7. In a process for the preparation of sugar from sugar cane, the clarifying of the raw sugar juice as claimed in claim 4, the heating and settling of the clarified juice for the further removal of impurities therefrom and the filtration of the precipitate.

8. A process as claimed in claim 4 in which phosphate is added to the juice prior to formation of the precipitate.

9. In a process for the preparation of sugar from sugar cane, the clarifying of the sugar juice as claimed in claim 4, including immediate evaporation of liquid from the clarified juice to effect crystallisation of sugar and the filtration of the precipitate.

10. A process as claimed in claim 9 including the washing of the filter cake formed during filtration with water at ambient temperature.

References Cited

UNITED STATES PATENTS

| | | | |
|---|---|---|---|
| 2,059,110 | 10/1936 | Ioannu | 127—46 X |
| 2,249,920 | 7/1941 | Taussig et al. | 127—50 X |
| 2,340,128 | 1/1944 | Kent | 127—50 |
| 2,776,229 | 1/1957 | Peterson | 127—50 X |
| 3,097,970 | 7/1963 | Delfin | 127—48 |
| 3,166,442 | 1/1965 | Duke | 127—48 |
| 3,232,793 | 2/1966 | Bourne et al. | 127—50 |

OTHER REFERENCES

Sugar Cane Handbook, Spencer-Meade, 9th ed., 1963, pp. 100, 131.

"Clarification of Sugar Cane Juice with Polyelectrolytes," A. Briggs Bonneville, Sugar, November 1953, pp. 36–39.

MORRIS O. WOLK, *Primary Examiner.*

U.S. Cl. X.R.
127—46, 50